United States Patent [11] 3,623,569

[72] Inventor Floyd A. Wilkins
 22055 Donald St., East Detroit, Mich. 48021
[21] Appl. No. 888,713
[22] Filed Dec. 29, 1969
[45] Patented Nov. 30, 1971

[54] MOTOR VEHICLE ANTITHEFT MEANS AND METHOD
5 Claims, 4 Drawing Figs.
[52] U.S. Cl................................................. 180/114, 335/170, 335/174, 307/10 AT
[51] Int. Cl.................................................. B60r 25/00
[50] Field of Search........................................ 180/114; 307/10; 340/63, 64; 200/42; 335/170, 174

[56] References Cited
UNITED STATES PATENTS
| 2,876,429 | 3/1959 | Noztitz | 340/64 |
| 3,439,771 | 4/1969 | Commins | 180/114 |
| 2,515,044 | 7/1950 | Kappel | 307/10 X |
| 2,862,110 | 11/1958 | Bonvissuto | 200/42 X |
| 3,494,156 | 2/1970 | Schweizer et al. | 307/10 X |
| 3,525,414 | 8/1970 | Copelan | 180/114 |

Primary Examiner—Kenneth H. Betts
Attorney—William L. Fisher

ABSTRACT: Motor antitheft means and method are disclosed comprising secretly locating a normally open manually actuable electrical switch means on a motor vehicle so that its location thereon is known only to an authorized user of said motor vehicle, electrically incorporating said switch means in the ignition circuit of said motor vehicle so that the latter is rendered incapable of being energized upon use of the ignition key or upon bypassing of the ignition switch by hot wiring until said switch means is actuated from its normally open position to a close position by said authorized user, holding said switch means in said close position upon and during energization of said ignition circuit to maintain said ignition circuit energized until the ignition key is turned to off position, and upon deenergization of said ignition circuit, actuating said switch means to its normally open position to render said ignition circuit incapable of being energized upon use of the ignition key or upon bypassing of the ignition switch by hot wiring.

PATENTED NOV 30 1971 3,623,569

INVENTOR.
FLOYD. A. WILKINS
BY William L. Fisher Esq.
HIS ATTORNEY

MOTOR VEHICLE ANTITHEFT MEANS AND METHOD

My invention relates to motor vehicles.

Motor vehicle thefts are tremendously high in number in this country and are increasing at alarming rates. My invention defeats the efforts of a motor vehicle thief by requiring him to take the time to search for a hidden electrical switch which must be found and actuated before the vehicle's ignition circuit can be energized. Time is of the essence in a motor vehicle theft and this time required of a thief to search for a hidden electrical switch is time the motor vehicle thief does not have to take. It takes a thief enough time as it is to surreptitiously hot wire a motor vehicle to bypass the ignition switch in order to energize the ignition circuit. By virtue of my invention the thief's efforts in hot wiring the motor vehicle are in vain because he must still locate and actuate the hidden electrical switch in order to energize the ignition circuit.

The principal object of my invention is the provision of simplified and entirely practical means and method which advantageously and beneficially hamper and impede the theft of motor vehicles.

The motor vehicle antitheft means and method of my invention may be embodied in an extremely simple and low cost mechanism by which it has appeal to motor vehicle manufacturers. Said motor vehicle antitheft mechanism can be incorporated as original equipment in new motor vehicles or can be sold in the after market for installation on existing vehicles.

The foregoing object of my invention and its advantages will become apparent during the course of the following description, taken in conjunction with the accompanying drawings, in which.

Figure 1:
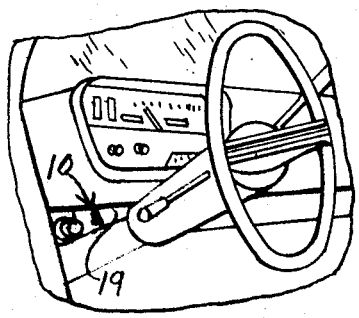
FIG. 1 is a perspective view from within the passenger compartment of a motor vehicle equipped with a motor vehicle antitheft mechanism embodying my invention.

Referring to the drawings in greater detail, 10 generally designates manually actuable electrical switch means constructed to be electrically incorporated in the ignition circuit of a motor vehicle and to be physically located on said motor vehicle in a secret location known only to an authorized user of said motor vehicle. Said switch means has means normally holding said switch means in an open position to render said ignition circuit incapable of being energized upon use of the ignition key. Said means normally holding said switch means 10 in an open position comprises in the instance yieldable means in the form of a tension spring 12. Said switch means 10 is manually actuable by said authorized user in the instance via a moveable switch element 14 from said open to a close position so as to render said ignition circuit capable of being energized upon use of the ignition key. Said switch means 10 has means operative upon and during energization of said ignition circuit for holding said switch means 10 in said close position to maintain said ignition circuit energized until the ignition key is turned to off position. Said means operative upon and during energization of said ignition circuit for holding said switch means 10 in said close position comprises in the instance electromagnetic means in the form of a direct-current solenoid 16 which operates upon said switch element 14. Said tension spring 12 is operative upon deenergization of said ignition circuit to actuate said switch means 10 from said close position to said open position to render said ignition circuit incapable of being energized upon use of the ignition key.

Figure 2:
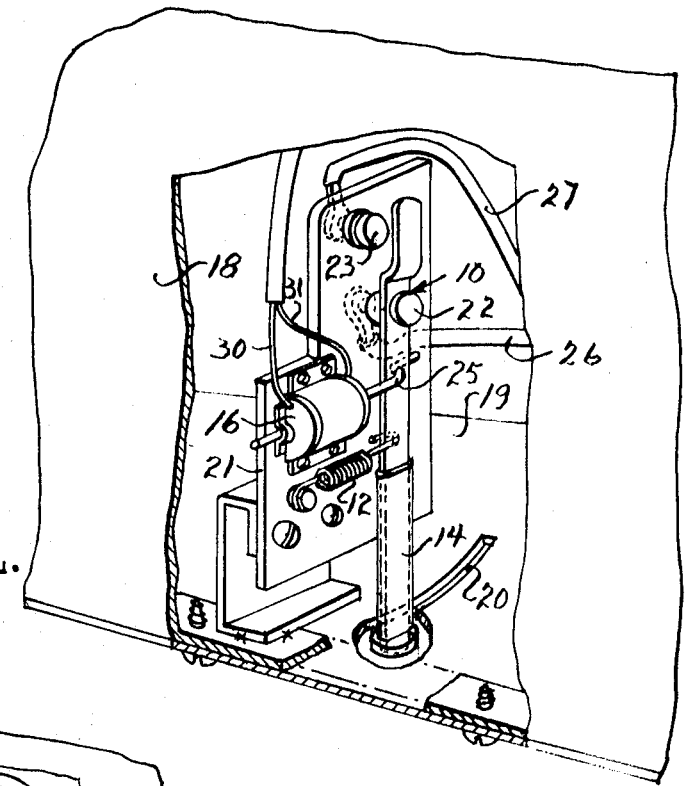
FIGS. 2 and 3 are perspective views of said embodiment with the electrical switch thereof in open and close positions, respectively.
Figure 3:
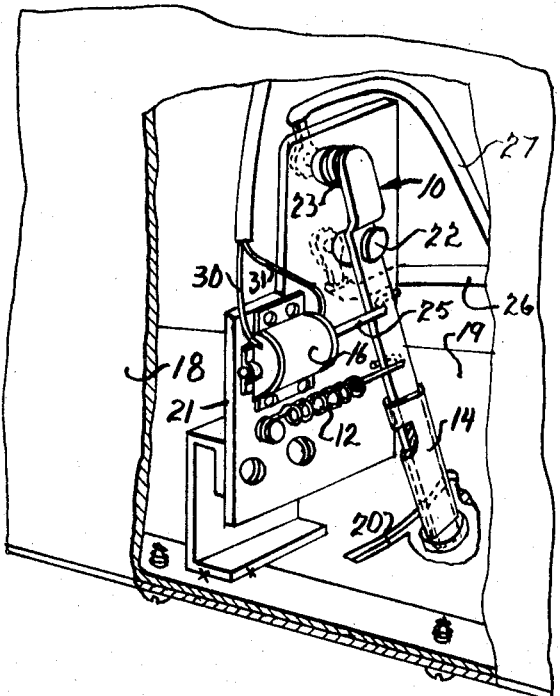

In the instance said manually actuable electrical switch means 10 are mounted hidden behind the dashboard 10 of a motor vehicle so that only the lower end or handle of the switch element 14 projects beneath the dashboard apron 19 through a slot 20 therein. The switch element 14 is pivotally carried on a mounting bracket 21 which is suitably affixed to the dashboard 18 and the pivot means therefor, indicated at 22, forms one of two switch contacts for said switch means 10, the other of which is designated 23. The upper end of the switch element 14 bridges the switch contacts 22 and 23 in the close position of said switch means 10. One end of the tension spring 12 is anchored to the mounting bracket 21 and the other end is affixed to the switch element 14 below the pivot means 22 therefor so as to pull upon the lower end of the switch element 14 to hold the upper end of the switch element 14 as shown in FIG. 2 out of contact with the switch contact 23 whenever the solenoid 16 is not energized. The solenoid 16 is fastened to the mounting bracket 21 and the plunger 25 thereof is affixed to the switch element 14 below the pivot means 22.

Figure 4:
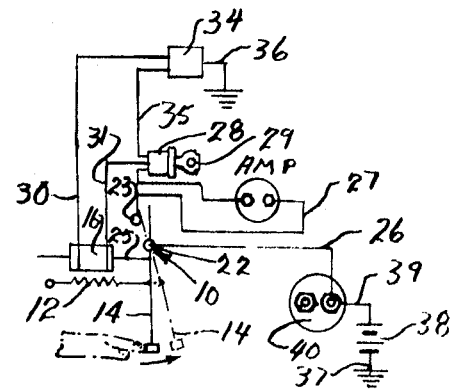
FIG. 4 is a schematic diagram showing said embodiment of motor vehicle antitheft means and method electrically incorporated in the ignition circuit of a motor vehicle.

Said switch means 10 may be electrically incorporated in the ignition circuit of said motor vehicle as shown in FIG. 4 in which the switch contacts 22 and 23 are wired via electrical lines 26 and 27 in series in the hot line to the combination ignition-starter switch 28, the ignition key for which is designated 29. The solenoid 16 is wired via electrical lines 30 and 31 in series with the ignition resistor which is an element of the firing circuitry (which includes, inter alia, the ignition coil, said ignition resistor, the distributor mechanism, the spark plugs, etc.) indicated by the block diagram 34. The bypass electrical line for bypassing the ignition resistor when the starter motor is energized is designated 35. The ground for the elements of the firing circuitry 34 which must be grounded, such as the spark plugs and one of the distributor points, is indicated at 36 and the ground for the battery 38 at 37. The electrical wire 26 picks up the battery voltage at a terminal for the starter solenoid 40 to which is connected the hot cable 39 from the battery 38.

In operation of my invention the switch means 10 is maintained in open position by the tension spring 12 which hampers and impedes a motor vehicle thief sufficiently in "hot wiring" the ignition switch as the time available to him is minimal to begin with and even if he completes his efforts and successfully "hot wires" the ignition switch he finds himself completely baffled as he still cannot energize the ignition circuit so long as the switch means 10 remains open. An authorized user of the motor vehicle, on the other hand, knowing of the existence and location of the switch means 10 merely has to manually actuate the switch element 14 to close the switch contacts 22 and 23 while he turns the ignition key 29 to start the motor vehicle whereupon the authorized user can release the switch element 14 as the solenoid 16 then becomes energized and its plunger 25 pushes upon the switch element 14 against the urging of the tension spring 12 and maintains the switch element 14 in close position bridging the switch contacts 22 and 23. As shown in FIG. 4 when the ignition key 29 is turned to its extreme position while the switch contacts 22 and 23 are bridged by the switch element 14 the starter switch is closed and the starter solenoid 40 is energized. At the same time the ignition switch is closed and the firing circuitry 34 is energized and if the latter is firing regularly the ignition key 29 is released from its extreme position to open the starter switch which deenergizes the starter solenoid 40 and deenergizes the starter motor which has already been disengaged from the flywheel. The solenoid 16 energizes upon energization of the firing circuitry 34 and its plunger 25 pushes upon the switch element 14 to hold the latter in its close position until the ignition key 29 is turned to off position in which event the firing circuitry 34 and the solenoid 16 become deenergized whereupon the switch means 10 is actuated from its close to its open position by the pulling action of the tension spring 12 upon the switch element 14.

It will thus be seen that there has been provided by my invention motor vehicle antitheft means and method in which the object hereinabove set forth together with many thoroughly practical advantages has been successfully achieved. While a preferred embodiment of my invention has been shown and described it is to be understood that variations and changes may be resorted to without departing from the spirit of my invention as defined by the appended claims. It is within the spirit of my invention to construct the switch means 10 so that it doesn't have to be manually held closed while the ignition-starter switch is turned to on position to start the motor vehicle. Means may be provided in conjunction with said switch means 10 to hold the switch element 14 in its close position once it has been actuated to said close position by a latch mechanism which can be unlatched by the tension spring 12 or by a spring operated timing mechanism which will hold the switch element 14 in its closed position for a short interval after it has been actuated to its close position. If the switch means 10 were so modified it would have to be actuated to close position by said authorized user prior to turning of the ignition key 29 to start the motor vehicle but it could then be located anywhere on the motor vehicle.

What is claimed is:

1. Motor vehicle antitheft means for use on a motor vehicle to hinder theft thereof comprising a single electrical switch means constructed to be electrically incorporated in the ignition circuit of said motor vehicle and to be physically located on said motor vehicle in a secret location known only to authorized users of said motor vehicle, said switch means having a single pair of switch contacts, and a moveable switch element having an open position in respect to said switch contacts and a close position bridging said switch contacts, said switch means having yieldable means normally holding said moveable switch element in said open position, said moveable switch element being manually actuable by one of said authorized users in opposition to said yieldable means from said open to said close position, said switch means having electromagnetic means adapted to be in series with said switch contacts so as to be energized when said moveable switch element is in close position, said moveable switch element having to be held by said authorized user in its close position until energization of said electromagnetic means, said electromagnetic means, when energized, acting in opposition to said yieldable means for holding and maintaining said moveable switch element in said close position to maintain itself energized, said yieldable means operative upon deenergization of said electromagnetic means to actuate said moveable switch element from said close to said open position.

2. Motor vehicle antitheft means as claimed in claim 1, said switch means having a pivot connection, said moveable switch element pivotally moveable via said pivot connection.

3. Motor vehicle antitheft means as claimed in claim 2, said pivot connection located intermediate the ends of said moveable switch element and being one of said switch contacts, the other switch contact being at an end of said moveable switch element, said moveable switch element having a handle portion at the other end thereof by which it is manually actuable, said yieldable means applying a pulling force on said moveable switch element between said handle portion thereof and said pivot connection therefor, and said electromagnetic means, when energized, applying a pushing force on said moveable switch element between said handle portion thereof and said pivot connection therefor.

4. Motor vehicle antitheft means for use on a motor vehicle to hinder theft thereof comprising a single electrical switch means electrically incorporated in the ignition circuit of said motor vehicle and physically located on said motor vehicle in a secret location known only to authorized users of said motor vehicle, and switch means having a single pair of switch contacts in series with the vehicle ignition switch and a single moveable switch element having an open position in respect to said switch contacts and a close position bridging said switch contacts, said switch means having yieldable means normally holding said moveable switch element in said open position to render said ignition circuit incapable of being energized upon use of the ignition key or upon bypassing of the ignition switch by hot wiring, said moveable switch element being manually actuable by one of said authorized users in opposition to said yieldable means from said open to said close position to render said ignition circuit capable of being energized, said switch means having electromagnetic means in series with both said ignition switch and with said switch contacts so as to be energized upon energization of said ignition circuit, said moveable switch element having to be manually held by said authorized user in its close position until energization of both said ignition circuit and said electromagnetic means, said electromagnetic means, when energized, acting in opposition to said yieldable means for holding and maintaining said moveable switch element in said close position to maintain both said ignition circuit and itself energized until the ignition key is turned to off position, said yieldable means operative upon simultaneous deenergization of both said ignition circuit and said electromagnetic means to actuate said moveable switch element from said close to said open position to render said ignition circuit incapable of being energized upon use of the ignition key or upon bypassing of the ignition switch by hot wiring.

5. Motor vehicle antitheft method for use on a motor vehicle to hinder theft thereof comprising providing a single electrical switch means having a single pair of switch contacts and a single moveable switch element having an open position in respect to said switch contacts and a close position bridging said switch contacts, secretly locating said switch means on a motor vehicle so that its location thereon is known only to authorized users of said motor vehicle, electrically incorporating said switch means in the ignition circuit of said motor vehicle so that said switch contacts are in series with the vehicle ignition switch, applying a yieldable force to said moveable switch element to normally hold it in said open position to render said ignition circuit incapable of being energized upon use of the ignition key or upon bypassing of the ignition switch by hot wiring, manually actuating said moveable switch element in opposition to said yieldable force from said open to said close position to render said ignition circuit capable of being energized, electrically holding said moveable switch element in its close position in opposition to said yieldable force as long as said ignition circuit remains energized, applying said yieldable force to said moveable switch element upon deenergization of said ignition circuit to actuate said moveable switch element from said close to said open position to render said ignition circuit incapable of being energized upon use of the ignition switch or upon bypassing of the ignition switch by hot wiring.

* * * * *